Jan. 1, 1952    A. BALMA    2,580,505
STAPLING MACHINE
Filed Feb. 1, 1949    5 Sheets—Sheet 1
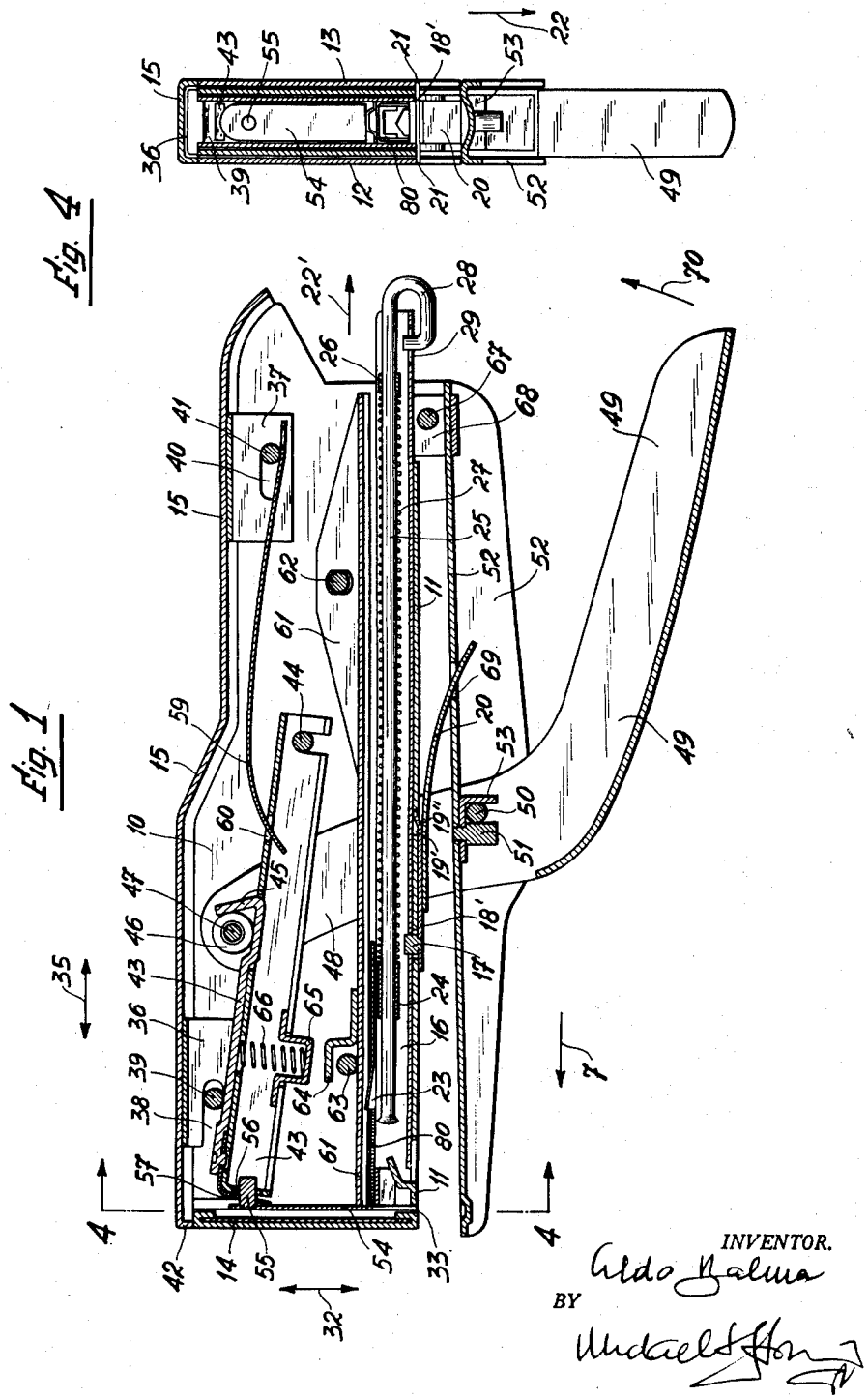
INVENTOR.
Aldo Balma
BY
Michael S. Hong

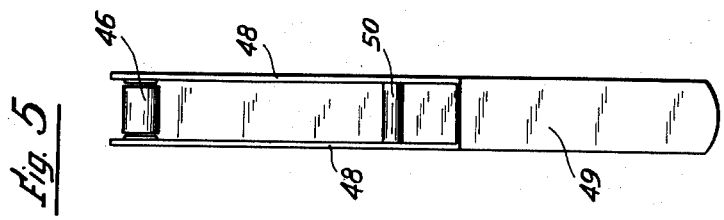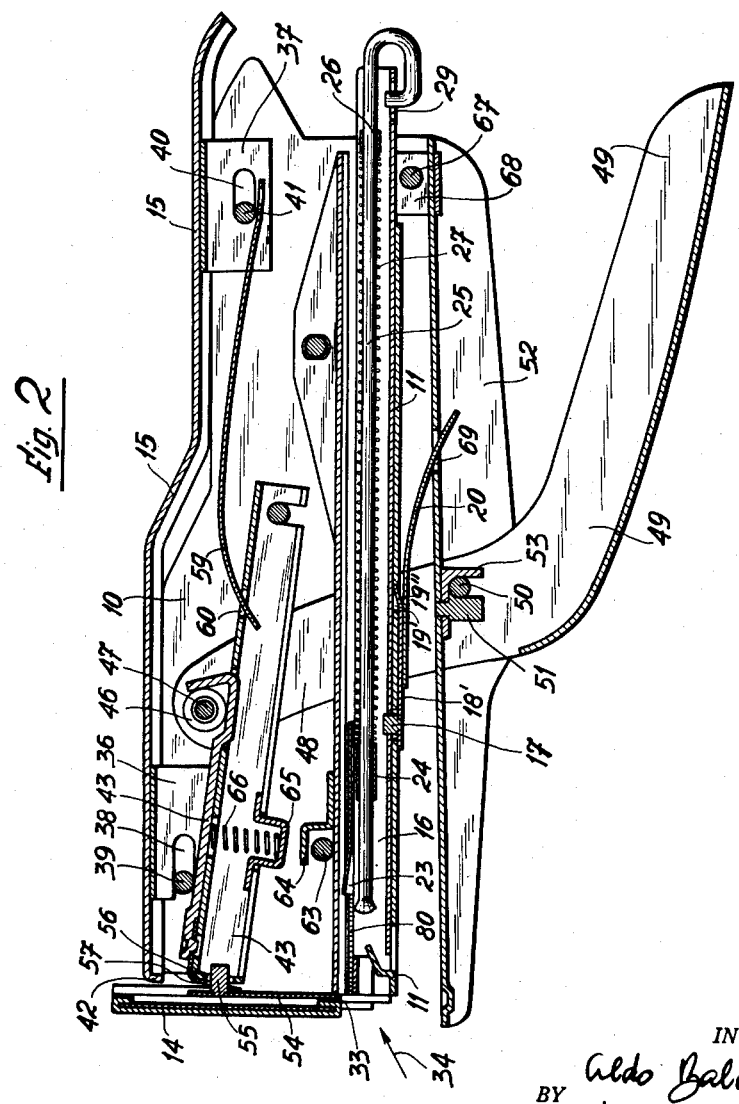

Jan. 1, 1952 A. BALMA 2,580,505
STAPLING MACHINE
Filed Feb. 1, 1949 5 Sheets-Sheet 3
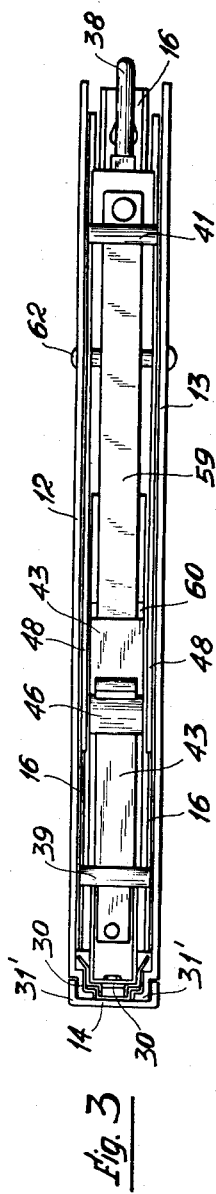
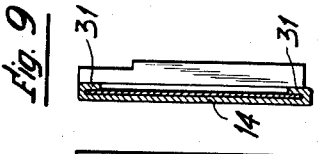
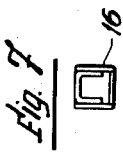
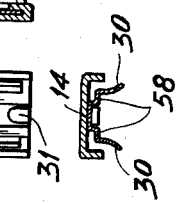
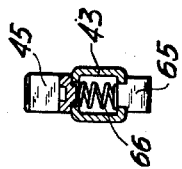
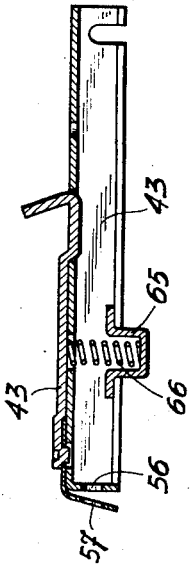

Jan. 1, 1952
A. BALMA
2,580,505
STAPLING MACHINE
Filed Feb. 1, 1949
5 Sheets-Sheet 4
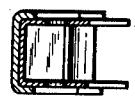
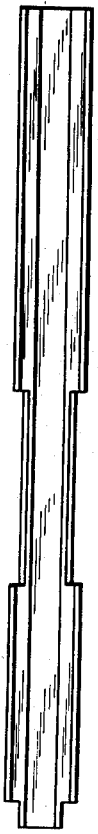
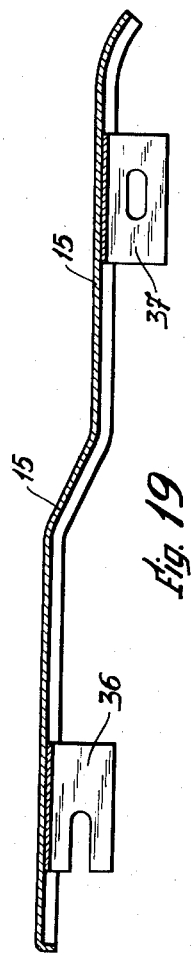
INVENTOR.
Aldo Balma
BY Jan. 1, 1952 A. BALMA 2,580,505
STAPLING MACHINE
Filed Feb. 1, 1949 5 Sheets-Sheet 5

INVENTOR.
Aldo Balma
BY

Patented Jan. 1, 1952

2,580,505

UNITED STATES PATENT OFFICE 2,580,505

STAPLING MACHINE

Aldo Balma, Voghera, Italy, assignor to Balma, Capoduri & C., Voghera, Italy

Application February 1, 1949, Serial No. 73,929
In Italy August 17, 1948

9 Claims. (Cl. 1—49)

My present invention relates to stapling machines.

It is an object of my present invention to provide a stapling machine which permits removal of staples blocking proper operation of the stapler in an extremely simple and fast manner.

It is a further object of my present invention to provide a stapler which despite its simple construction is reliable in operation and easy to repair, whenever necessary.

With the above objects in view my new stapling machine comprises a housing having a loading opening at its rear end and a stapling slot at its front end; a staple supporting member insertable into said housing through said loading opening at its rear end so as to reach within said housing to said stapling slot at the front end of the same, holding means removably holding said staple supporting member in inserted position in said housing adapted to guide staples to said stapling slot, a pushing member also insertable into said housing through said loading opening at the rear end of the same and cooperating in inserted position with said staple supporting member so as to force said staples towards said stapling slot, means removably holding said pushing member in inserted position, and manually operable operating means for consecutively ejecting staples guided by said staple supporting member through said stapling slot.

In accordance with a preferred embodiment of my present invention, the pushing member mentioned above is carried in inserted position by the staple supporting member.

The above mentioned holding means for the staple supporting means include a spring pressed projection mounted in the housing adapted to engage an aperture in the elongated staple supporting member and hold the same with the pushing member carried thereby, when the staple supporting member is inserted into the housing.

I have also found it advisable to provide my new stapling machine with a housing having two parallel sidewalls arranged at a certain distance from each other and to combine with such a housing a staple supporting member having a width smaller than the distance between the side walls so as to enable free pivotal movement of this staple supporting member about the pin means mentioned above.

I also provide in some types of staplers according to my present invention the housing with a slidable front wall forming part of said housing and slidably secured to the front edges of said side walls so as to be movable between closing position forming at its bottom end only a stapling slot and opening position permitting free access to the inside of said housing. With such a slidable front wall I preferably combine locking means movably mounted on said housing positioned normally in locked position holding said slidable front wall in closing position, but being manually movable from such locked position into unlocked position permitting sliding of said slidable front wall from closing into opening position. As locking means I preferably use a slidable top wall forming part of said housing and slidably secured to the top edges of said side walls so as to be movable between locked position holding said slidable front wall in closing position and unlocked position permitting sliding of said slidable front wall from closed into open position.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a longitudinal section through a stapler made according to my present invention in operative position with the slidable front wall of the stapler in closed position;

Fig. 2 shows a longitudinal secton through the stapler shown in Fig. 1 with the slidable front wall in open position and the movable top wall withdrawn to an unlocked position;

Fig. 3 shows a top view of the stapler shown in Figs. 1 and 2 with the slidable top wall thereof removed;

Fig. 4 shows a cross section through the stapler shown in Figs. 1-3, along line 4—4 of Fig. 1;

Fig. 5 is a detail view of the operating lever as it would appear looking to the right of Fig. 1;

Fig. 6 shows a longitudinal section of the staple guide and supporting member forming part of the stapler shown in Fig. 1;

Fig. 7 is a front elevation of the same staple guide;

Fig. 8 shows a side view of the inside of the slidable front wall as seen in the direction of arrow 7 of Fig. 1;

Fig. 9 is a side view of the front wall shown in Fig. 8;

Fig. 10 is a cross section of the slidable front wall shown in Fig. 8;

Fig. 11 is a longitudinal section of the stapling arm;

Fig. 12 is an end view of the stapling arm shown in Fig. 11;

Fig. 13 is a longitudinal section of the tiltable anvil;

Fig. 14 is a top view of the tiltable anvil of Fig. 13;

Fig. 15 is a front elevation of the same tiltable anvil;

Fig. 16 is a longitudinal section of the elongated staple counter guide member;

Fig. 17 is a top view of the staple counter guide member of Fig. 16;

Fig. 18 is a cross section of the same staple counter guide member;

Fig. 19 is a longitudinal section of the slidable top wall of the stapler housing;

Fig. 20 is a cross section of the slidable top wall shown in Fig. 19; and

Figure 21:
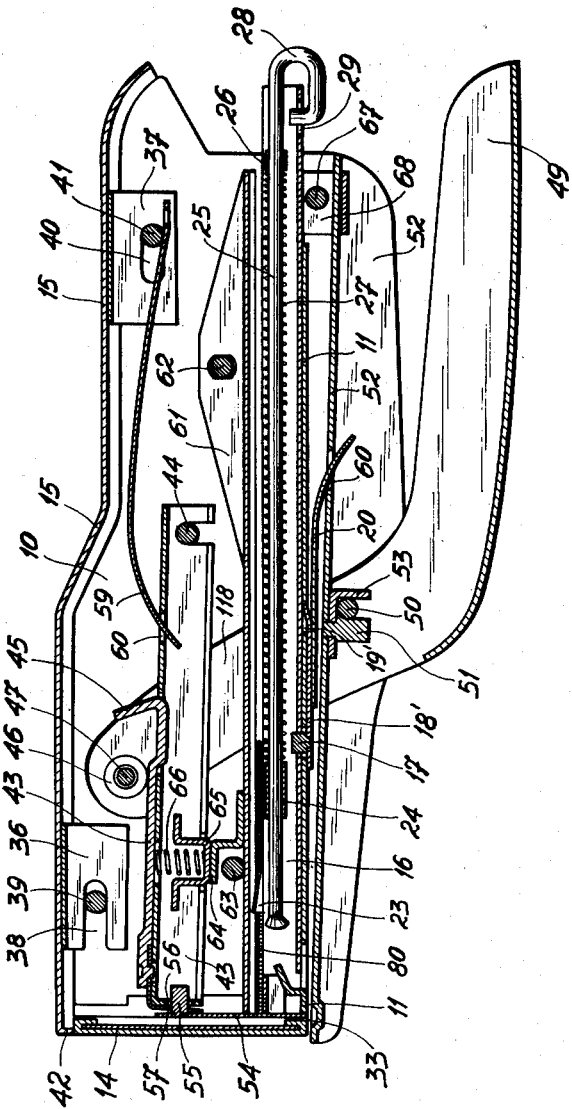
Fig. 21 is a longitudinal section of the stapler with all parts in operative position, with a staple completely driven.

My new stapler includes as main element the stapler housing 10 composed of a bottom wall 11 and two side walls 12 and 13. This housing 10 is open at its rear so as to provide a loading opening. It is also open at its front side and at its top; however, it is covered at its front side by a slidable front wall 14, and on its top by a slidable top wall 15, described in detail below.

The two side walls 12 and 13 are spaced from each other at a predetermined distance and form actually a deep channel. Within this channel the elongated staple supporting member 16 is arranged; as clearly shown in Fig. 3, this elongated staple supporting member 16 is substantially narrower than the distance between the side walls 12 and 13. In this manner the staple supporting member 16 can turn to a slight degree about the projection 17 reaching into the hole 18 provided in the bottom wall 19 of the staple supporting member 16. Such pivoting turning movement of the staple supporting member 16 enables proper positioning of the same during stapling.

The pivot projection 17, is secured to the laminated spring member 18' secured at 19 to wall 11 and the laminated spring 20 retains the parts in proper operating position. The spring member 18' is provided with two lateral extensions 21 permitting manual pulling of spring 18' together with the pivoting projection 17 downward in the direction of arrow 22 as indicated in Fig. 4. In this manner it is possible to disengage the projection 17 from the staple supporting member 16 whenever it is desired to remove the latter by sliding in the direction of arrow 22'.

The staple supporting member 16 carries the pushing member 23 having a U-shaped cross section so as to be adapted to be seated on the staple supporting member 16. To this staple pushing member 23 the sleeve 24 is secured. Through this sleeve passes the rod 25, as clearly shown in Fig. 1. This rod 25 is provided near its rear end with an abutment 26. The spring 27 is slidably arranged on rod 25 between sleeve 24 and abutment 26, permanently tending to slide the staple pushing member 23 along rod 25 in the direction of arrow 7. At its rear end the rod 25 is provided with a locking hook 28 adapted to enter hole 29 in the staple supporting member 16 for releasably locking said rod 25 in place.

As stated above, the front wall 14 of the housing 10 is slidable from its position shown in Fig. 1 into its position shown in Fig. 2 and back again. The front wall 14 shown in Figs. 8, 9 and 10 is provided with two sections, namely an internal section 30 and an external section 14, the latter forming a unit with section 30 by means of the inwardly bent frontal edge portions 31.

The slidable front wall 14 is shaped so as to form in operative position a stapling slot 33 permitting passage of one staple only. In the open position shown in Fig. 2, however, the staple containing portion of the housing is entirely open, as indicated by arrow 34, permitting easy removal of blocking staples.

In order to hold the slidable front wall in the operative position shown in Fig. 1, whenever desired, I make the top wall 15 of the housing slidable to and fro in the direction of arrow 35, as indicated in Fig. 1. Such sliding of the top wall 15 is made possible by the extensions 36 and 37 secured to the top wall. Extension 36 is provided with a slot 38 engaging pin 39 and extension 37 is provided with slot 40 engaging pin 41. Both pins 39 and 41 are secured to the opposite side walls 12 and 13 slidably holding the top wall 15.

As clearly shown in Figs. 1 and 2, this top wall 15 with its front end 42 holds the front plate or wall 14 in locked position which operates in turn to present a stapling slot at its bottom end.

Ejection of the staples is achieved by the stapling member 43 turnably held by the pivot 44 which is secured to the opposite side walls 12 and 13. This stapling member 43 is provided with a hook shaped projection 45. In the depressed portion of the stapling member defined by this hook shaped projection 45 the roller 46 is seated; this roller in turn is freely rotatably mounted on pin 47 which is secured to the projecting side walls 48 of the operating lever 49. This operating lever 49 is also provided with a pin 50, secured to its opposite side wall; this pin 50 is seated in the bearing formed by pin 51 and the bent plate 53, both secured to the anvil arm 52, as clearly shown in Figs. 1 and 2.

To the front end of the staple driving operating member 43 I attach the staple driver 54 by means of pin 55 and hole 56. This staple driver 54 is permanently pressed by means of spring 57 against corresponding bearing faces 58 on the guide members 30 secured to the slidable front wall 14. As clearly shown in Figs. 1 and 2, the staple driver 54 is arranged in the plane of the stapling slot 33 adapted to push down upon and drive the staple located in this plane and to eject it through the slot, when the operating parts will occupy the positions shown in Fig. 21.

In order to hold the stapling member 43 and the stapling lever 49 in an elevated position I provide the spring 59 engaging at one end slot 60 in the stapling member 43 and abutting at the other end against pin 41.

I have found it expedient to provide guiding means for preventing unintentional lifting of the staples from the staple supporting member 16. For this purpose I provide the elongated counterguide 61 (Fig. 16) pivoted to the housing by a removable pin 62. Unintentional upward movement of this guiding means or staple counter-guide 61 is prevented by pin 63. This staple counter-guide is provided with the projection 64 adapted to be engaged by the knob 65 which is secured to the stapling member 43 and operated by means of spring 66. This projection 64 and knob 65 are arranged relative to each other in such manner that the knob presses projection 64 and the guiding member 61 to which this projection is secured, downward against the staples when the stapling member 43 is turned downward about pivot 44 by the stapling lever 49 (see Fig. 21).

The anvil arm 52 mentioned above is pivoted by means of pivot 67 to the extensions 68 of the side walls 12 and 13 of the housing 10. The above mentioned spring 20 engages the holes 69 in the anvil member 52 so as to press the same permanently in downward direction, away from the housing.

My new stapler is operated as follows:

First, the pushing member 23 and rod 25 are removed from the housing by disengagement of hook 28.

Then the staples can be loaded into the magazine of the staple supporting member 16 on the projecting part at the rear end of the appliance (the staples being supplied in blocks of 50 staples each). In the same way, the pushing member will be reinserted, this member moves the staples forward on the staple supporting member. Said pushing member will be secured in inserted position by the locking hook 28 which is adapted to enter hole 29 in the staple supporting member 16. Thus the stapler is ready for operation.

During stapling the operating lever 49 is manually turned upwards in direction of arrow 70; such turning results first in turning of the anvil arm 52 about pivot 67 until it abuts with its front portion against the bottom face of the housing, pressing the material to be stapled against the bottom face of the stapler. When lever 49 is operated in the direction of arrow 70, pin 50 is raised and the roller 46 lowered; the raising of pin 50 brings the anvil 52 in proximity to the staple outlet 33 thereby clinching as in a vise the sheets of paper or other material which are to be stapled. The lowering of roller 46 depresses the rocker 43 which by means of the attached nut 55 lowers the plates 54, whereby the foremost one of the row of staples in the magazine is released and penetrates the surface to the stapler and is clinched against the anvil 52.

If a jam occurs at the plier, we can proceed in two ways:

(1) Pull back the top wall 15 and raise the frontal plate 14 giving access to the front end of the guide 16. It will then be easy to remove bent staples or whatever is obstructing the appliance and making the stapler work improperly.

(2) If after performing the above operations, the stapler still refuses to work properly and there is reason to suspect some irregularity in the forward movement of the staples, the guide or staple-supporting member may also be removed, lowering the pin 17 by means of the lateral extensions 21 of the spring member 18' where the pin 17 is attached. In any case, it will be better as the first step to remove the pushing member from the housing. After everything has been removed, the bent staples or whatever else is obstructing the appliance should be taken out. Then, having reinserted the guide 16, lowered the frontal plate 14 and returned the cover 15 to a locking position with respect to the frontal plate 14, the user can refill the stapler with the staples and push them forward while also putting back the pushing member 23 and engaging the hook 28 at its rear end to enter hole 29 in the staple supporting member 16.

It will be understood that each of the elements described above, or two or more together, may also find a useful application in other types of staplers differing from the types described above.

While I have illustrated and described the invention as embodied in staplers held in the hand during operation, I do not intend to be limited to the details shown, since various modifications and structural changes may be made without departing in any way from the spirit of my invention.

What I claim as new and desire to secure by Letters Patent is:

1. Stapling machine comprising in combination a housing having a loading opening at its rear end and a stapling slot at its front end; an elongated staple supporting member removably insertable into said housing through said loading opening at its rear end so as to reach within said housing to said stapling slot at the front end of the same; pivotal retaining means removably pivoting said elongated staple supporting member in inserted position to said housing so that the same is adapted to pivot about said pivotal retaining means and to properly guide staples to said stapling slot; means for urging the staples toward said stapling slot; and manually operable staple driving means for consecutively ejecting staples guided by said elongated staple supporting member through said stapling slot.

2. Stapling machine comprising in combination a housing having a loading opening at its rear end and having a stapling slot at its front end; an elongated staple supporting member removably insertable into said housing through said loading opening at its rear end so as to reach within said housing to said stapling slot at the front end of the same; retaining means removably pivoting said elongated staple supporting member in inserted position to said housing so that the same is adapted to pivot about said retaining means and to properly guide staples along said staple supporting member to said stapling slot; spring operated means for urging the staples along the staple supporting member toward said stapling slot; and manually operable staple driving means for consecutively ejecting staples guided by said elongated staple supporting member through said stapling slot.

3. Stapling machine comprising in combination a housing having a loading opening at its rear end and a stapling slot at its front end; an elongated staple supporting member removably insertable into said housing through said loading opening at its rear end so as to reach within said housing to said stapling slot at the front end of the same; transverse pivoting means movably mounted on said housing spaced a distance from both ends thereof and adapted to detachably pivot said elongated staple supporting member in inserted position intermediately to said housing so that the same is adapted to pivotally rock about said pivoting means and to properly guide staples along said elongated staple supporting member to said stapling slot; means resiliently urging the staples toward said stapling slot; and manually operable staple driving means for consecutively ejecting staples guided by said elongated staple supporting member through said stapling slot.

4. Stapling machine comprising in combination a housing having two parallel side walls spaced a predetermined distance apart from each other, the housing having a loading opening at its rear end and a stapling slot at its front end; a removable elongated staple support in the housing extending to the stapling slot; an elongated staple counter-guide for holding down staples to said staple support having a width smaller than the distance between the side walls of said housing extending substantially in parallelism with and above the elongated staple support within said housing to said stapling slot; retaining means movably mounted in said housing spaced a distance from both ends thereof and adapted to connect said elongated staple counter-guide in inserted position to said housing; means resiliently urging the staples toward said stapling slot; and manually operable staple driving means for consecutively ejecting staples guided by said elongated staple support and staple counter guide through said stapling slot.

5. Stapling machine comprising in combination a housing having a loading opening at its rear end and a stapling slot at its front end; an elongated staple supporting member removably insertable into said housing through said loading opening at its rear end so as to reach within said housing to said stapling slot at the front end of the same; transverse pivoting means movably arranged in said housing spaced a distance from both ends thereof and adapted to detachably pivot said elongated staple supporting member in inserted position to said housing so that the same is adapted to rock upon said pivoting means and to properly guide staples to said stapling slot; spring means at one end secured to said housing and at the other end associated with said pivoting means and holding the same resiliently in operative pivoting position, said other end of said spring means being movable together with said pivoting means from operative position away from said supporting member whereby said pivoting means are detached from said supporting member for removal of said elongated staple supporting member from said housing; means resiliently urging the staples toward said stapling slot; and manually operable means for consecutively ejecting staples.

6. Stapling machine comprising in combination a housing having two parallel side walls spaced a predetermined distance apart from each other and having a loading opening at its rear end; a slidable front wall forming part of said housing and slidably secured to the front edges of said side walls so as to be movable, in a closed position forming at its bottom end a stapling slot and in open position exposing a front opening giving free access to the inside of said housing; an elongated staple supporting member having a width smaller than the distance between the side walls of said housing and removably insertable into the same through said loading opening so as to reach within said housing to said stapling slot; pivoting means movably mounted on said housing spaced a distance from both ends thereof and adapted to detachably pivot said elongated staple supporting member in inserted position to said housing so that the same is adapted to pivot about said pivoting means supporting member; spring means at one end secured to said housing and at the other end associated with said pivoting means and holding the same resiliently in operative pivoting position, said other end of said spring means being movable together with said pivoting means from operative position away from said supporting member whereby said pivoting means are detached from said supporting member for removal of said elongated staple supporting member from said housing; means resiliently urging the staples toward said stapling slot; and manually operable staple driving means for consecutively ejecting staples guided by said elongated staple supporting member through said stapling slot.

7. Stapling machine comprising in combination a housing having two parallel side walls spaced a predetermined distance apart from each other and having a loading opening at its rear end; a slidable front wall forming part of said housing and slidably secured to the front edges of said side walls so as to be movable between a closed position forming at its bottom end a stapling slot and an open position exposing a front opening giving free access to the inside of said housing; locking means movably mounted on said housing positioned normally in locking position effectively holding said slidable front wall in closed position, but being manually movable from such locking position into unlocked position allowing sliding of said slidable front wall from closed into open position a staple support in said housing; an elongated staple counter guide cooperating with the staple support having a width smaller than the distance between the side walls of said housing extending within said housing to said stapling slot; pivoting means mounted on said housing spaced a distance from both ends thereof and adapted to pivot said elongated staple counter guide to said housing so that the same is adapted to pivot about said pivoting means and to properly hold down staples along said staple support; spring means at one end secured to said housing; a pivot mounted on the other end of said spring means adapted for pivoting said support to said housing, said pivot being removable from association with said support by manually moving said other end of said spring means away from said support; means resiliently urging the staples toward said stapling slot; and manually operable staple driving means for consecutively ejecting staples.

8. Stapling machine comprising in combination a housing having two parallel side walls spaced a predetermined distance apart from each other and having a loading opening at its rear end; a slidable front wall forming part of said housing and slidably secured to the front edges of said side walls so as to be movable between a closed position forming at its bottom end only a stapling slot and an open position exposing a front opening giving free access to the inside of said housing; a slidable top wall forming part of said housing and slidably secured to the top edges of said side walls so as to be movable between a forward locking position holding said slidable front wall in closed position and a rearward unlocked position allowing sliding of said slidable front wall from closed into open position; a staple supporting member detachably mounted in said housing; an elongated staple counter-guide having a width smaller than the distance between the side walls of said housing and extending in said housing to said stapling slot; pivoting means movably mounted on said housing spaced a distance from both ends thereof and adapted to pivot said elongated staple counter-guide to said housing so that the same is adapted to pivot about said pivoting means and to properly hold down staples guided along said elongated staple supporting member to said slot; spring means at one end secured to said housing; a pivot mounted on the other end of said spring means adapted for pivoting said staple supporting member to said housing, said pivot being removable from association with said staple supporting member by manually moving said other end of said spring means away from said staple supporting member; means resiliently urging the staples toward said stapling slot; and manually operable staple driving means for consecutively ejecting staples guided by said staple supporting member through said stapling slot.

9. Stapling machine comprising in combination a housing having a loading opening at its rear end and a stapling slot at its front end; an elongated staple supporting member removably insertable into the housing through said loading opening at its rear end so as to extend in said housing to said stapling slot at the front end of the same; retaining means removably holding said elongated staple supporting member within said housing in a position in which said elongated staple supporting member is adapted to guide staples to said stapling slot; a staple driving operating member pivoted within said housing and pivoting between an inactive position spaced from said stapling slot and an operating position moved towards said stapling slot; a depressed portion upon said staple driving operating member; manually operable operating means also pivoted to said housing and manually shiftable between an inoperative position in which it engages with said depressed portion and is ineffective to operate said staple driving operating member and an operative position pivotally shifting said staple driving operating member into operating position; spring means automatically returning said manually operable operating means from operative into inoperative position, whenever said operating means is not manually operated, so as to hold said staple driving operating member in inactive position; an elongated staple counter guide also disposed within said housing freely pivoted to the same in a position substantially parallel to and above said elongated staple supporting member; and resilient holding means on said staple driving operating member serving to engage said elongated staple counter guide and to press the same resiliently towards the staples supported by said elongated staple supporting member when said staple driving operating member is pivotally shifted from inactive into operative position.

ALDO BALMA.

REFERENCES CITED

The following references are of record in the file of this patent:

UNITED STATES PATENTS

| Number | Name | Date |
| --- | --- | --- |
| 2,174,219 | Balma | Sept. 26, 1939 |
| 2,245,506 | Skrebba | June 10, 1941 |
| 2,342,818 | Polzer | Feb. 29, 1944 |
| 2,345,267 | Keil | Mar. 28, 1944 |
| 2,438,712 | Lindstrom | Mar. 30, 1948 |